(12) United States Patent
Epstein et al.

(10) Patent No.: US 12,179,858 B2
(45) Date of Patent: Dec. 31, 2024

(54) SHAFT ARRANGEMENT AND STEERING GEAR HAVING A SHAFT ARRANGEMENT

(71) Applicant: KNORR-BREMSE Systeme fuer Nutzfahrzeuge GmbH, Munich (DE)

(72) Inventors: Dimitri Epstein, Wuppertal (DE); Dirk Lettow, Wuppertal (DE); Sven Kirschbaum, Mettmann (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 33 days.

(21) Appl. No.: 18/013,333

(22) PCT Filed: Jul. 5, 2021

(86) PCT No.: PCT/EP2021/068542
§ 371 (c)(1),
(2) Date: Dec. 28, 2022

(87) PCT Pub. No.: WO2022/017766
PCT Pub. Date: Jan. 27, 2022

(65) Prior Publication Data
US 2023/0264737 A1    Aug. 24, 2023

(30) Foreign Application Priority Data

Jul. 22, 2020  (DE) .................... 10 2020 119 281.9

(51) Int. Cl.
*B62D 5/24* (2006.01)
*B62D 6/10* (2006.01)

(52) U.S. Cl.
CPC ............... *B62D 5/24* (2013.01); *B62D 6/10* (2013.01)

(58) Field of Classification Search
CPC .................................. B62D 5/24; B62D 6/10
See application file for complete search history.

(56) References Cited

U.S. PATENT DOCUMENTS

| 4,200,030 A | 4/1980 | Elser |
| 4,303,099 A * | 12/1981 | Kervagoret ............ B62D 5/083 |
| | | 137/625.21 |

(Continued)

FOREIGN PATENT DOCUMENTS

| DE | 27 39 406 A1 | 3/1979 |
| DE | 10 2011 017 150 A1 | 10/2012 |

(Continued)

OTHER PUBLICATIONS

German-language Office Action issued in German Application No. 10 2020 119 281.9 dated Apr. 1, 2021 (eight (8) pages).
German-language Office Action issued in German Application No. 10 2020 119 281.9 dated Aug. 25, 2023 (9 pages).

(Continued)

*Primary Examiner* — Paul N Dickson
*Assistant Examiner* — Matthew Joseph Ganci
(74) *Attorney, Agent, or Firm* — Crowell & Moring LLP

(57) ABSTRACT

A shaft arrangement for a steering gear has an input shaft, an output shaft and a torsion rod. The torsion rod is connected in a rotationally secure manner to the input shaft in an input-side connection region of the shaft arrangement. The torsion rod is connected in a rotationally secure manner to the output shaft in an output-side connection region of the shaft arrangement. The input-side connection region is spaced apart from the output-side connection region. The shaft arrangement has a rotation prevention member, wherein the rotation prevention member limits a rotation of the input shaft relative to the output shaft to a maximum rotation angle and, when the maximum rotation angle is reached, can transmit a torque from the input shaft to the output shaft.

16 Claims, 2 Drawing Sheets

(56) References Cited

U.S. PATENT DOCUMENTS

| | | |
|---|---|---|
| 2017/0072988 A1 | 3/2017 | Strobel |
| 2017/0240202 A1* | 8/2017 | Birsching .............. B62D 6/003 |

FOREIGN PATENT DOCUMENTS

| | | |
|---|---|---|
| DE | 10 2014 102 807 B3 | 4/2015 |
| DE | 10 2014 212 367 A1 | 12/2015 |
| JP | 53-100541 A | 9/1978 |
| JP | 55-59069 A | 5/1980 |
| JP | 61-77569 A | 4/1986 |
| JP | 2-164671 A | 6/1990 |
| JP | 2014-201296 A | 10/2014 |
| JP | 2018-52323 A | 4/2018 |

OTHER PUBLICATIONS

International Search Report (PCT/ISA/210) issued in PCT Application No. PCT/EP2021/068542 dated Oct. 12, 2021 with English translation (four (4) pages).

German-language Written Opinion (PCT/ISA/237) issued in PCT Application No. PCT/EP2021/068542 dated Oct. 12, 2021 (eight (8) pages).

Japanese-language Office Action issued in Japanese Application No. 2023-504307 dated Jan. 15, 2024 with English translation (11 pages).

International Preliminary Report on Patentability (PCT/IB/326 & PCT/IB/373) issued in PCT Application No. PCT/EP2021/068542 dated Feb. 2, 2023, including English translation of document C2 (German-language Written Opinion (PCT/ISA/237), filed on Dec. 28, 2022) (nine (9) pages).

* cited by examiner

SHAFT ARRANGEMENT AND STEERING GEAR HAVING A SHAFT ARRANGEMENT

BACKGROUND AND SUMMARY

The invention relates to a shaft arrangement for a steering gear having an input shaft, having an output shaft and having a torsion rod, wherein the torsion rod is connected in a rotationally secure manner to the input shaft in an input-side connection region of the shaft arrangement, wherein the torsion rod is connected in a rotationally secure manner to the output shaft in an output-side connection region of the shaft arrangement, and wherein the input-side connection region is spaced apart from the output-side connection region. The invention further relates to a steering gear having a shaft arrangement.

When a vehicle is steered, steering forces must be transmitted from a steering wheel to wheels of the vehicle. This is carried out by means of a steering gear. Steering gears generally have a torsion rod which provides a play desired during the steering. A torsion rod is a rotationally resilient element. It connects two shafts of the steering gear, such as, for example, a steering-wheel-side input shaft to a wheel-side output shaft. The output shaft may be provided directly with a thread, pinions or the like so that the rotational movement of the output shaft can be converted into a linear movement.

Steering gears having torsion rods are known from the prior art. Thus, DE 10 2011 017 150 A1 describes a steering column having two shaft portions which are coupled by means of a torsion rod. The torsion rod is rotationally resilient and arranged within the shaft portions. This arrangement does not provide any safety mechanism in the event that the torsion rod should break, for example, as a result of material fatigue or overloading. This would result in a failure of the steering system.

DE 10 2014 212 367 A1 describes a steering gear having a steering input shaft and a pinion shaft which is coupled to the steering input shaft by means of a torsion rod. The steering input shaft is supported in a housing. The housing has a locking element. If the steering rod breaks, the locking element limits an axial movement of the steering input shaft. A magnet of the steering gear is thereby prevented in such a case from being able to collide with a support bearing in which the steering input shaft is guided.

In this regard, an object of the invention is to provide a shaft arrangement with a torsion rod which has a higher level of operational safety. Furthermore, an object of the invention is to provide a steering gear in which safe steering is also further possible even when a torsion rod of the steering gear is damaged.

The objectives are achieved by a shaft arrangement and by a steering gear in accordance with the independent claims. The dependent claims relate to different, advantageous developments of the present invention which are independent of each other and whose features can be freely combined with each other by the person skilled in the art as far as technically advantageous.

According to a first aspect of the invention, a shaft arrangement for a steering gear is provided. The shaft arrangement has an input shaft, an output shaft and a torsion rod, wherein the torsion rod is connected in a rotationally secure manner to the input shaft in an input-side connection region of the shaft arrangement. Furthermore, the torsion rod is connected in a rotationally secure manner to the output shaft in an output-side connection region of the shaft arrangement. Finally, the input-side connection region is spaced apart from the output-side connection region. According to the invention, the shaft arrangement has a rotation prevention member which limits a rotation of the input shaft relative to the output shaft to a maximum rotation angle and which, when the maximum rotation angle is reached, can transmit a torque from the input shaft to the output shaft.

A significant aspect is the basic consideration of configuring the shaft arrangement by providing a rotation prevention member according to the invention in such a manner that the rotation which is desired in principle of the two elements, input shaft and output shaft, is limited to a maximum. The risk of breakage of the torsion rod is thereby already advantageously significantly reduced. Furthermore, the negative consequences with respect to the operational safety of the overall system are limited to a significant degree since, even if the torsion rod should ever fail, the transmission of the rotational movement continues to be taken over by the rotation prevention member according to the invention. Consequently, it is ensured that, even in the event of breakage of the torsion rod, steering continues to be possible.

The rotation prevention member enables a rotation of the input shaft relative to the output shaft as far as the maximum rotation angle. The rotation of the input shaft relative to the output shaft may according to the invention be a rotation about a longitudinal axis of the shaft arrangement. If the torsion rod is damaged, it is possible that it may no longer be able to transmit torque from the input shaft to the output shaft. In this instance, the rotation prevention member ensures that the maximum rotation angle between the input shaft and the output shaft is not exceeded. The rotation prevention member further ensures that the torsion rod is not rotated excessively, whereby it may become damaged. The torsion rod may according to the invention be a rod-like rotationally flexible resilient element. It is rotationally resiliently deformed during the rotation of the input shaft relative to the output shaft along the length thereof between the input-side connection region and the output-side connection region.

Advantageously, the rotation prevention member may be configured in such a manner that torque which has to be transmitted from the input shaft to the output shaft is transmitted exclusively via the rotation prevention member.

The rotation prevention member is preferably formed by a safety pin which is connected to the input shaft in a rotationally secure manner and by a recess in the output shaft, wherein a portion of the safety pin is arranged so as to protrude into the recess, and wherein the recess is sized in such a manner that between a wall of the recess and the safety pin there is a play which permits the rotation of the input shaft relative to the output shaft. Between the safety pin and the wall of the recess, there is consequently a spacing or free space which enables the rotation of the input shaft relative to the output shaft. Only when the safety pin strikes the wall is the rotation no longer possible. The safety pin may have various geometric shapes. Preferably, however, it has a cylindrical shape. Various geometric shapes are also possible for the recess but they should be adapted to the form of the safety pin. The recess may, for example, be configured to extend through the output shaft in a direction transverse relative to the axis of the output shaft completely and in a further preferred manner centrally, for example as a through-hole, and the safety pin may be guided completely though the recess. If the output shaft is, for example, constructed to be internally hollow in the region of the recess, the recess can then be formed at both opposing covering face portions of the hollow shaft.

It is advantageous for the recess to have mutually opposing safety faces against which the safety pin can come to rest when the input shaft is rotated relative to the output shaft, wherein the spacing and/or the angular position of the safety faces with respect to each other determine(s) the maximum rotation angle. The recess may thus, for example, partially have a wedge-like cross section, which enables a rotation of the input shaft relative to the output shaft within specific limits. The recess may in this instance advantageously be constructed to extend from the outer circumferential face of the output shaft when viewed in the direction of the axis of the output shaft in a wedge-like manner. Therefore, the recess may then have at the respective outer covering face of the output shaft a greater opening width than on the respective inner face, facing the axis, of the covering face portion of the output shaft.

Preferably, the input shaft has an input-side input shaft hole in which a portion of the safety pin is received in a play-free manner. A hole is intended in the context of the invention to be understood to be any hollow space which is placed in an element, regardless of how it was produced. The input-side input shaft hole is arranged in a particularly preferred manner so as to extend transversely relative to the axis of the input shaft and centrally and preferably extends completely through the input shaft. According to the invention, it is possible for the input-side input shaft hole to have a circular cross section, wherein the safety pin is cylindrical. The safety pin may be inserted into the input-side input-shaft hole and be removed therefrom as necessary. Preferably, the center of the input-side input shaft hole and the above-described recess in the output shaft are orientated so as to correspond to each other.

Preferably, the safety pin connects the torsion rod to the input shaft in a rotationally secure manner in the input-side connection region. The safety pin consequently not only serves to secure the input shaft with respect to the output shaft, but also produces the rotationally secure connection between the input shaft and the torsion rod. This is preferably implemented in such a manner that the torsion rod has an input-side torsion rod hole in which a portion of the safety pin is received in a play-free manner. The safety pin can consequently be arranged partially in the input-side input shaft hole and in the input-side torsion rod hole, wherein another portion of the safety pin is arranged in the recess. Preferably, the input-side input shaft hole and the input-side torsion rod hole are orientated in alignment with each other. According to other embodiments of the invention, it is also possible for the safety pin not to be used to connect the input shaft to the torsion rod. It is then possible, for example, for another connection means, such as a connection pin or the like, to be inserted into the input shaft and the torsion rod.

According to the invention, there may be provision for the output shaft to have an output-side output shaft hole in the output-side connection region and for the torsion rod to have an output-side torsion rod hole in the output-side connection region, wherein a connection pin is partially received in the output-side output shaft hole and the output-side torsion rod hole in a play-free manner in each case. In this manner, the torsion rod may be connected to the output shaft in a rotationally secure manner. In the context of the present invention, however, other possibilities are also conceivable as to how the torsion rod can be connected to the output shaft.

According to a particular embodiment of the invention, the output shaft has a passage which extends in the longitudinal direction of the output shaft and in which the torsion rod is arranged at least to a great extent. Inside the passage the torsion rod is resiliently deformed when the input shaft is rotated relative to the output shaft. Since the torsion rod is arranged inside the output shaft, the shaft arrangement may have a comparatively short construction type since no additional spacing for the torsion rod has to be provided, for example, between the input shaft and the output shaft. According to the invention, it is possible for the torsion rod, at least with the portion which extends from the input-side connection region to the output-side connection region, to be arranged in the passage of the output shaft. However, the torsion rod may according to the invention also extend in other regions of the output shaft. According to a variant of the invention, the torsion rod may further protrude from an end of the output shaft. Preferably, with respect to the length when viewed along the axis of the torsion rod at least 70%, preferably at least 80%, in a further preferred manner at least 90%, in particular at least 95%, of the torsion rod is arranged in the passage of the output shaft.

The input shaft preferably has at the end thereof facing the output shaft a receiving space which receives at least one end portion of the output shaft. In order to connect the input shaft to the output shaft, the output shaft can consequently be inserted into the receiving space of the input shaft. The receiving space may, for example, be constructed in a cylindrical manner. The receiving space may further advantageously be in the form of a blind hole bore. In this instance, according to an advantageous embodiment of the invention, the rotation prevention member is arranged at the height of the receiving space. For example, the above-described safety pin may be inserted in the input shaft and in the output shaft at the height of the receiving space.

Preferably, not only the end portion of the output shaft is received by the input shaft, but instead the torsion rod is also arranged at the height of the receiving space inside the output shaft. This means that an end of the torsion rod is arranged at the height of the receiving space inside the end portion of the output shaft. In a particularly preferred manner, the rotationally secure connection between the torsion rod and the input shaft is formed at the height of the receiving space. To this end, the safety pin may according to the invention be inserted at the height of the receiving space in holes of both the input shaft and the torsion rod.

According to an advantageous embodiment of the invention, the component of the shaft arrangement which forms the rotationally secure connection in the input-side connection region between the torsion rod and the input shaft further forms a portion of the rotation prevention member. The component may be a safety pin described above or a comparable locking element. In this embodiment, however, the precise configuration of the rotation prevention member can be freely selected and is not limited to the variant described above, in which the output shaft has a recess in which a portion of the safety pin is arranged.

The output shaft is preferably a threaded spindle. A threaded spindle is provided with an outer thread. In the present invention, the outer thread preferably extends over at least a portion of the threaded spindle between the input-side connection region and the output-side connection region. In a steering gear there is positioned in most cases on the outer thread of the threaded spindle a nut (also referred to as a recirculating ball nut) which is enclosed in the steering gear in such a manner that it cannot rotate. During rotation of the threaded spindle, therefore, the nut is displaced axially along the threaded spindle. The nut may, for example, be coupled to a steering column lever via which steering forces are transmitted to wheels of a vehicle. The shaft arrangement according to the invention may, however, in principle also be used in other application fields.

According to another aspect of the invention, a steering gear which is provided with the shaft arrangement described above is described. This steering gear is preferably constructed in such a manner that forces can be transmitted from a steering wheel to the input shaft of the shaft arrangement. The input shaft is resiliently coupled to the output shaft of the shaft arrangement by means of the torsion rod. If the torsion rod breaks or for other reasons cannot perform the coupling function thereof any longer, steering is nonetheless still possible via the steering gear. This is enabled by the rotation prevention member of the shaft arrangement which limits a rotation of the input shaft relative to the output shaft to a maximum rotation angle and which, when the maximum rotation angle is achieved, can transmit a torque from the input shaft to the output shaft.

The drawings illustrate an advantageous embodiment of the invention.

DETAILED DESCRIPTION OF THE DRAWINGS

Figure 1:
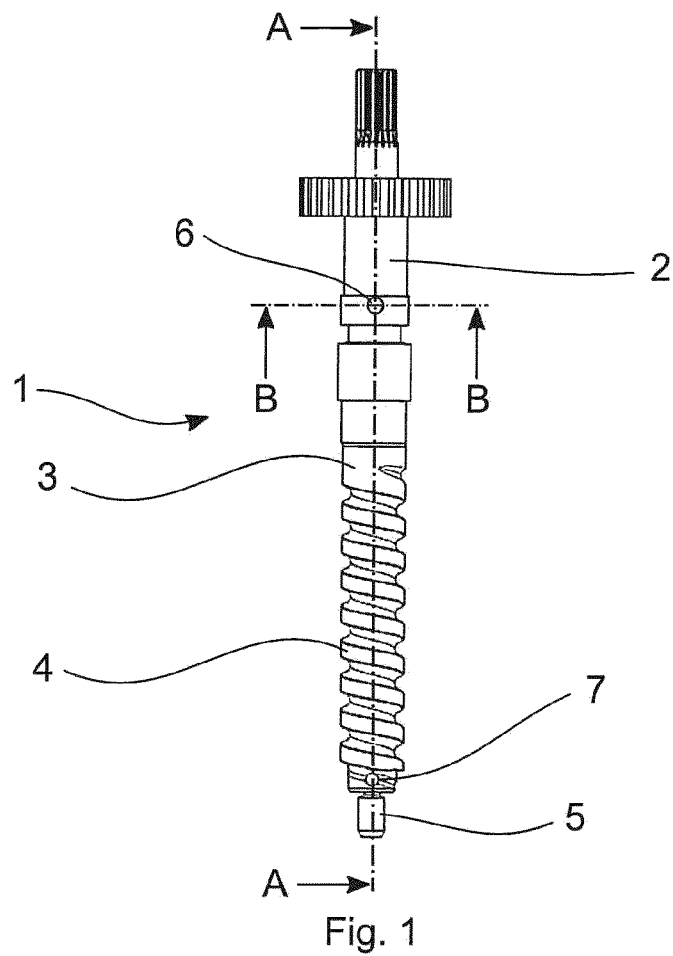
FIG. 1 is a schematic illustration of a shaft arrangement according to an embodiment of the invention for a steering gear as a side view.

FIG. 1 shows a schematic illustration of a shaft arrangement 1 for a steering gear as a side view. The shaft arrangement 1 has an input shaft 2 and an output shaft 3, wherein the output shaft 3 is a threaded spindle. The output shaft 3 is provided with an outer thread 4. When the shaft arrangement 1 is used in a steering gear, there may be positioned on the outer thread 4, for example, a nut (also referred to as a recirculating ball nut) which, when the output shaft 3 rotates, moves axially along the output shaft 3 and which can be coupled to a steering lever of the steering gear. The shaft arrangement 1 further has a torsion rod 5. The torsion rod 5 is for the most part arranged inside the output shaft 3 or the input shaft 2 and protrudes from the output shaft 3 only with a small portion as shown in FIG. 1.

The output shaft 3 is inserted into a receiving space (which cannot be seen in FIG. 1) of the input shaft 2. In a portion of the input shaft 2 which has the receiving space, a safety pin 6 is further introduced. The safety pin 6 connects, on the one hand, the input shaft 2 to the torsion rod 5 in a rotationally secure manner. On the other hand, the safety pin 6 limits a rotation of the input shaft 2 relative to the output shaft 3 to a maximum rotation angle. The shaft arrangement 1 further has a connection pin 7. This connection pin 7 is inserted in an end of the output shaft 3 opposite the input shaft 2. The connection pin 7 connects the torsion rod 5 to the output shaft 3 in a rotationally secure manner.

Figure 2:
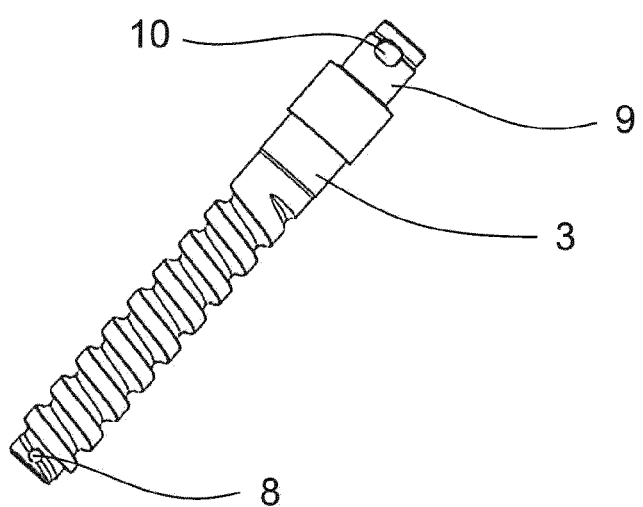
FIG. 2 is a schematic illustration of an output shaft of the shaft arrangement as a side view.

FIG. 2 shows a schematic illustration of the output shaft 3 of the shaft arrangement. The output shaft 3 has an output-side output shaft hole 8 for receiving the connection pin 7 which is not illustrated in this instance. An end portion 9 of the output shaft 3 is constructed to be slightly narrower than other portions of the output shaft 3. The end portion 9 of the output shaft 3 can be inserted into the input shaft. There is a recess 10 in the end portion 9. The safety pin 6, which is also not illustrated here in FIG. 2, is guided through this recess 10.

Figure 3:
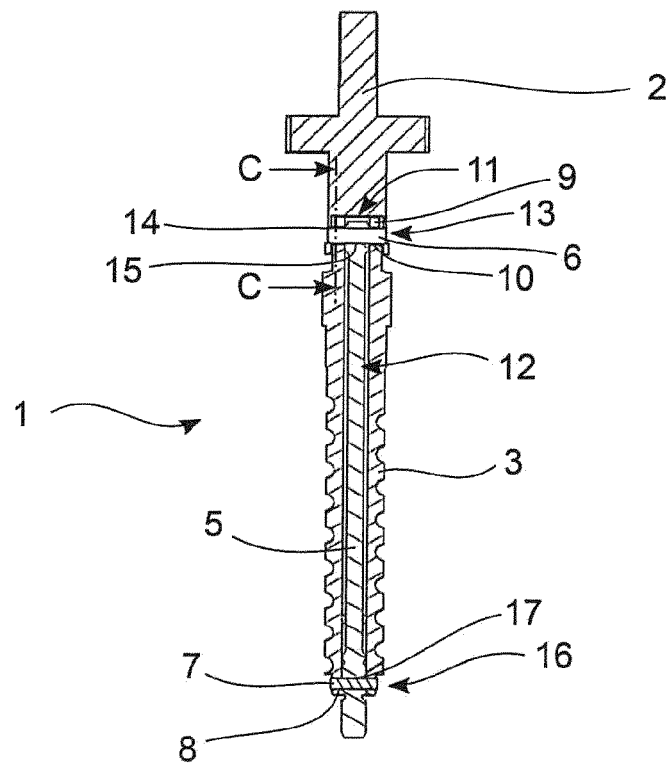
FIG. 3 is a schematic illustration of the shaft arrangement as a sectioned view.

FIG. 3 shows a schematic illustration of the shaft arrangement 1 as a sectioned view. The section extends along the line of section A-A according to FIG. 1. The operating method of the shaft arrangement 1 is explained in greater detail below. The input shaft 2 has a receiving space 11. The end portion 9 of the output shaft 3 is inserted in the receiving space 11 of the input shaft 2. The output shaft 3 has a passage 12 in which the torsion rod 5 is arranged. The torsion rod 5 is connected in an input-side connection region 13 of the shaft arrangement 1 to the input shaft 2 in a rotationally secure manner by means of the safety pin 6. The safety pin 6 is positioned in a play-free manner in an input-side input shaft hole 14 of the input shaft 2 and in an input-side torsion rod hole 15 of the torsion rod 5. The torsion rod 5 is further connected in an output-side connection region 16 of the shaft arrangement 1 to the output shaft 3 in a rotationally secure manner by means of the connection pin 7. The connection pin 7 is positioned in a play-free manner in the output-side connection shaft hole 8 of the output shaft 3 and an output-side torsion rod hole 17 of the torsion rod 5. The input shaft 2 is consequently connected to the output shaft 3 by means of the torsion rod 5. Since the torsion rod 5 is rotationally resilient, a rotation movement of the input shaft 2 relative to the output shaft 3 is possible.

However, the input shaft 2 should not be able to be rotated too far relative to the output shaft 3. Particularly when the torsion rod 5 is damaged, it should be ensured that a torque can still be transmitted from the input shaft 2 to the output shaft 3. This is ensured by the safety pin 6. The safety pin 6 is guided through the recess 10 of the output shaft 3. The recess 10 is sized in such a manner that between the safety pin 6 and a wall of the recess 10 there is a play which permits a rotation of the input shaft 2 relative to the output shaft 3 up to a maximum rotation angle. This can be seen in FIGS. 4 and 5. The recess 10 and the safety pin 6 together form a rotation prevention member of the shaft arrangement 1.

Figure 4:
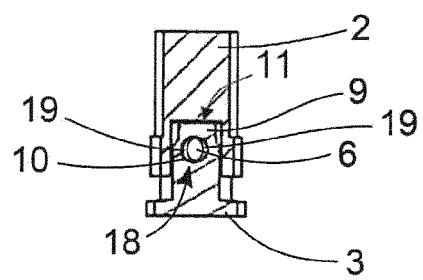
FIG. 4 is a schematic illustration of a rotation prevention member of the shaft arrangement as a sectioned view.

FIG. 4 shows a schematic illustration of the rotation prevention member 18 of the shaft arrangement as a sectioned view. The section extends along the line of section C-C from FIG. 3. The rotation prevention member 18 is formed by the recess 10 and the safety pin 6. The recess 10 is located in the end portion 9 of the output shaft 3. The safety pin 6 is guided through the recess 10. Free spaces 19 which enable a movement of the safety pin 6 in the recess 10 are provided between the safety pin 6 and a wall of the recess 10. Consequently, it is possible to rotate the input shaft 2 relative to the output shaft 3 until a maximum rotation angle is reached, at which the safety pin 6 comes to rest against safety faces 20 (FIG. 5) of the recess 10.

Figure 5:
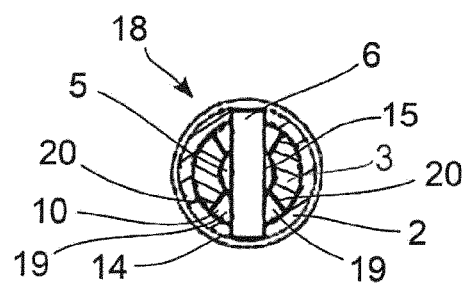
FIG. 5 is a schematic illustration of the rotation prevention member of the shaft arrangement as another sectioned view.

FIG. 5 shows a schematic illustration of the rotation prevention member 18 of the shaft arrangement as another sectioned view. This section extends along the line of section B-B from FIG. 1. The safety pin 6 is positioned in a play-free manner in the input-side input shaft hole 14 of the input shaft 2 and in the input-side torsion rod hole 15 of the torsion rod 5. The safety pin 6 is further guided through the recess 10 of the output shaft 3. There are free spaces 19 between safety faces 20 of the recess 10 and the safety pin 6. Consequently, it is possible to rotate the input shaft 2 relative to the output shaft 3 until the safety pin 6 moves into abutment with the safety faces 20. In this manner, the torsion rod 5 is prevented from being rotated too far and, if the torsion rod 5 should fail, a transmission of a torque from the input shaft 2 to the output shaft 3 can be carried out via the safety pin 6.

LIST OF REFERENCE NUMERALS

1 Shaft arrangement
2 Input shaft
3 Output shaft
4 Outer thread
5 Torsion rod
6 Safety pin
7 Connection pin
8 Output-side output shaft hole
9 End portion
10 Recess
11 Receiving space
12 Passage
13 Input-side connection region
14 Input-side input shaft hole
15 Input-side torsion rod hole
16 Output-side connection region
17 Output-side torsion rod hole
18 Rotation prevention member
19 Free space
20 Safety face

The invention claimed is:

1. A shaft arrangement for a steering gear, comprising:
an input shaft;
an output shaft, wherein the output shaft is in the form of a threaded spindle; and
a torsion rod, wherein the torsion rod is for the most part arranged inside the output shaft, wherein the torsion rod is connected in a rotationally secure manner to the input shaft in an input-side connection region of the shaft arrangement,
the torsion rod is connected in a rotationally secure manner to the output shaft in an output-side connection region of the shaft arrangement,
the input-side connection region is spaced apart from the output-side connection region; and
a rotation prevention member, wherein the rotation prevention member limits a rotation of the input shaft relative to the output shaft to a maximum rotation angle and, when the maximum rotation angle is reached, is able to transmit a torque from the input shaft to the output shaft.

2. A shaft arrangement for a steering gear, comprising:
an input shaft;
an output shaft; and
a torsion rod, wherein at least a portion of the torsion rod is arranged inside the output shaft, wherein the torsion rod is connected in a rotationally secure manner to the input shaft in an input-side connection region of the shaft arrangement,
the torsion rod is connected in a rotationally secure manner to the output shaft in an output-side connection region of the shaft arrangement,
the input-side connection region is spaced apart from the output-side connection region; and
a rotation prevention member, wherein the rotation prevention member limits a rotation of the input shaft relative to the output shaft to a maximum rotation angle and, when the maximum rotation angle is reached, is able to transmit a torque from the input shaft to the output shaft, wherein the rotation prevention member is formed by a safety pin which is connected to the input shaft in a rotationally secure manner and by a recess in the output shaft,
a portion of the safety pin is arranged so as to protrude into the recess, and
the recess is sized such that between a wall of the recess and the safety pin there is a play which permits the rotation of the input shaft relative to the output shaft.

3. The shaft arrangement as claimed in claim 2, wherein the recess has mutually opposing safety faces against which the safety pin comes to rest when the input shaft is rotated relative to the output shaft, and
a spacing and/or an angular position of the safety faces with respect to each other determine(s) the maximum rotation angle.

4. The shaft arrangement as claimed in claim 2, wherein the input shaft has an input-side input shaft hole in which a portion of the safety pin is received in a play-free manner.

5. The shaft arrangement as claimed in claim 2, wherein the safety pin connects the torsion rod to the input shaft in a rotationally secure manner in the input-side connection region.

6. The shaft arrangement as claimed in claim 2, wherein the torsion rod has an input-side torsion rod hole in which a portion of the safety pin is received in a play-free manner.

7. The shaft arrangement as claimed in claim 1, wherein the output shaft has an output-side output shaft hole in the output-side connection region and the torsion rod has an output-side torsion rod hole in the output-side connection region, and
a connection pin is partially received in the output-side output shaft hole and the output-side torsion rod hole in a play-free manner in each case.

8. The shaft arrangement as claimed in claim 1, wherein the output shaft has a passage which extends in a longitudinal direction of the output shaft and in which the torsion rod is arranged.

9. The shaft arrangement as claimed in claim 8, wherein the torsion rod, at least with a portion which extends from the input-side connection region to the output-side connection region, is arranged in the passage of the output shaft.

10. The shaft arrangement as claimed in claim 1, wherein the input shaft has, at an end thereof facing the output shaft, a receiving space which receives at least one end portion of the output shaft.

11. The shaft arrangement as claimed in claim 10, wherein the rotation prevention member is arranged at an upper portion of the receiving space.

12. The shaft arrangement as claimed in claim 10, wherein the torsion rod is arranged at the upper portion of the receiving space inside the output shaft.

13. The shaft arrangement as claimed in claim 12, wherein the rotationally secure connection between the torsion rod and the input shaft is formed at the upper portion of the receiving space.

14. The shaft arrangement as claimed in claim 1, wherein a component of the shaft arrangement which forms the rotationally secure connection in the input-side connection region between the torsion rod and the input shaft further forms a portion of the rotation prevention member.

15. A steering gear comprising a shaft arrangement as claimed in claim 1.

16. A shaft arrangement for a steering gear, comprising:
an input shaft;
an output shaft; and a torsion rod, wherein the torsion rod is connected in a rotationally secure manner to the input shaft in an input-side connection region of the shaft arrangement, the torsion rod is connected in a rotationally secure manner to the output shaft in an output-side connection region of the shaft arrangement, wherein the torsion rod protrudes from an end of the output shaft at the output-side connection region of the shaft arrangement, the input-side connection region is spaced apart from the output-side connection region; and a rotation prevention member, wherein the rotation prevention member limits a rotation of the input shaft relative to the output shaft to a maximum rotation angle and, when the maximum rotation angle is reached, is able to transmit a torque from the input shaft to the output shaft.

\* \* \* \* \*